US012606380B2

(12) United States Patent
Cao et al.

(10) Patent No.: US 12,606,380 B2
(45) Date of Patent: Apr. 21, 2026

(54) ROLLER CONVEYING RACKS WITH QUICKLY ADJUSTABLE WIDTH

(71) Applicant: TCL ZHONGHUAN RENEWABLE ENERGY TECHNOLOGY CO., LTD., Tianjin (CN)

(72) Inventors: Jingen Cao, Tianjin (CN); Rui Wu, Tianjin (CN); Zhijun Wu, Tianjin (CN); Limin Zhang, Tianjin (CN); Dawei Wang, Tianjin (CN); Wei Jiang, TianJin (CN); Yao Wan, Tianjin (CN); Yilin Xu, Tianjin (CN); Yuan Peng, Tianjin (CN); Yinhu Wan, Tianjin (CN); Yannan Li, Tianjin (CN); Wenkai Luan, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 268 days.

(21) Appl. No.: 18/555,526

(22) PCT Filed: Jun. 29, 2023

(86) PCT No.: PCT/CN2023/103863
§ 371 (c)(1),
(2) Date: Oct. 15, 2023

(87) PCT Pub. No.: WO2024/002242
PCT Pub. Date: Jan. 4, 2024

(65) Prior Publication Data
US 2025/0074706 A1      Mar. 6, 2025

(30) Foreign Application Priority Data
Jun. 30, 2022    (CN) .......................... 202221664623.5

(51) Int. Cl.
*B65G 13/12* (2006.01)
*B65G 21/14* (2006.01)
(Continued)

(52) U.S. Cl.
CPC ............. *B65G 13/12* (2013.01); *B65G 21/14* (2013.01); *B65G 39/09* (2013.01); *B65G 41/00* (2013.01)

(58) Field of Classification Search
CPC ...................................................... B65G 13/12
See application file for complete search history.

(56) References Cited

U.S. PATENT DOCUMENTS

| 3,263,951 A | * | 8/1966 | Stokes | .................... B65G 13/11 248/172 |
| 6,510,942 B2 | * | 1/2003 | McTaggart | ............. B65G 13/12 198/860.1 |

(Continued)

FOREIGN PATENT DOCUMENTS

| CN | 103991678 A | 8/2014 |
| CN | 208907441 U | 5/2019 |

(Continued)

OTHER PUBLICATIONS

International Search Report in International application No. PCT/CN2023/103863,mailed on Oct. 11, 2023.
Written Opinion of the International Search Authority in International application No. PCT/CN2023/103863,mailed on Oct. 11, 2023.

*Primary Examiner* — William R Harp
(74) *Attorney, Agent, or Firm* — PV IP PC; Wei Te Chung

(57) ABSTRACT
A roller conveying rack includes two carrier plates with rectangular shapes, wherein the carrier plates are arranged in parallel and aligned, legs are disposed on both sides of a bottom of each carrier plate in a longitudinal direction of the carrier plate, the legs on different carrier plates are con-
(Continued)

nected by sleeve shafts broken in a middle portion, rolling sleeves broken in a middle portion are arranged between upper portions of the carrier plates in the longitudinal direction of the carrier plates, movable shafts are disposed at the broken middle portion of the sleeve shafts and connecting shafts are disposed at the broken middle portion of the rolling sleeves, insertion holes are provided on each sleeve shaft between the legs and threaded holes are provided on each movable shaft between the legs, and each insertion hole is connected to a corresponding threaded hole by a bolt.

16 Claims, 5 Drawing Sheets

(51) Int. Cl.
B65G 39/09 (2006.01)
B65G 41/00 (2006.01)

(56) References Cited

U.S. PATENT DOCUMENTS

| | | | |
|---|---|---|---|
| 2002/0066647 | A1 | 6/2002 | McTaggart et al. |
| 2024/0059495 | A1* | 2/2024 | Avupati ................. B65G 39/02 |

FOREIGN PATENT DOCUMENTS

| | | |
|---|---|---|
| CN | 211415295 U | 9/2020 |
| CN | 213247429 U | 5/2021 |
| CN | 215612870 U | 1/2022 |
| CN | 216036713 U | 3/2022 |
| CN | 216470175 U | 5/2022 |
| CN | 217755499 U | 11/2022 |
| JP | H06329228 A | 11/1994 |

* cited by examiner

ROLLER CONVEYING RACKS WITH QUICKLY ADJUSTABLE WIDTH

CROSS-REFERENCE TO RELATED APPLICATION

This application is a national phase application of International Application No. PCT/CN2023/103863, filed on Jun. 29, 2023, which claims the benefit of priority to Chinese Patent Application No. 202221664623.5 filed on Jun. 30, 2022, the content of which is incorporated herein by reference in its entirety.

TECHNICAL FIELD

The present disclosure relates to roller conveying lines, and more particularly, to roller conveying racks with quickly adjustable width.

BACKGROUND

A roller conveying line is an important type of conveying line, and is generally assembled by a plurality of independent conveyors. The roller conveying line is widely applied to a production conveying line of manufacturing enterprise, due to its simple structure, low cost, and high conveying efficiency. In order to convey different types and sizes of products, an enterprise generally customizes a conveying line capable of adjusting a height and a width. For example, an adjustable-width conveying line includes a main body portion, a plurality of first rollers, a plurality of second rollers, and a plurality of frame width adjusting portions. The first roller includes a first roller portion body. The first roller portion body has a first receiving space. The second roller includes a roller extension. The first roller is connected to the second roller, and the roller extension is slidable between a first position and a second position in the first receiving space of the first roller body. The frame width adjusting portion includes a first frame, a second frame, and an adjusting member. The adjusting member has a second accommodating space. A distance between the first frame and the second frame can be adjusted in the second accommodating space. Therefore, the width of the conveying line can be changed by the first roller, the second roller, and the frame width adjusting part, thereby solving the problem that materials whose width exceeds a fixed width of the conveying line cannot be conveyed.

Although a current roller conveying line of adjustable width can adjust a width of the frame and the roller, to adjust a width of the entire conveying line, each roller on the conveying line needs to be adjusted. In addition, a plurality of frame adjustment portions are provided. Therefore, the plurality of frame adjustment portions need to be adjusted accordingly, so that when the width of the conveying line is adjusted, many same adjustment operations need to be repeated, and the structure of the conveying line can be complicated. Therefore, the speed for adjusting the width of the conveying line can be greatly reduced, manufacturing cost of the conveying line can be increased, and the difficulty of maintenance of the conveying line can be increased.

SUMMARY

In view of the above, in an embodiment of the present disclosure, a roller type conveying rack of rapidly adjustable width is provided, which includes two carrier plates with rectangular shapes, wherein the two carrier plates are arranged in parallel and aligned, legs are disposed on both sides of a bottom of each of the carrier plates in a longitudinal direction of the carrier plate, the legs on different ones of the carrier plates are connected by sleeve shafts and each of the sleeve shafts is broken in a middle portion, rolling sleeves are arranged between upper portions of the two carrier plates in the longitudinal direction of the carrier plates and each of the plurality of rolling sleeves is broken in a middle portion, movable shafts are disposed at the broken middle portion of the sleeve shafts and connecting shafts are disposed at the broken middle portion of the rolling sleeves, both end portions of each of the movable shafts are provided with limiting plates and are inserted into a respective one of the sleeve shafts, and both end portions of each of the connecting shafts are inserted into a respective one of the rolling sleeves, blocking rings are provided at respective through-notches within the sleeves and respective openings within the rolling sleeves, both end portions of each of the rolling sleeves are provided with rotating shafts, each of the rotating shafts is sleeved with a bearing fixed onto a respective one of the carrier plates, and servo motors for driving the rotating shafts to rotate are provided in the carrier plates, a plurality of insertion holes are provided on each of the sleeve shafts between the legs and a plurality of threaded holes are provided on each of the movable shafts between the legs, and each of the insertion holes is connected to a respective one of the threaded hole by a bolt.

In another aspect, a roller conveying rack with quickly adjustable width is provided, the roller conveying rack includes: two carrier plates arranged in parallel and aligned, wherein each of the two carrier plates has a rectangular shape; and legs disposed on both sides of a bottom of each of the carrier plates in a longitudinal direction of the carrier plate, wherein any two opposite legs of the legs in a width direction of the carrier plate are connected by a sleeve shaft broken in a middle portion and a movable shaft, the two carrier plates are connected by at least one set of a rolling sleeve broken in a middle portion and a connecting shaft, wherein a plurality of insertion holes are provided on the sleeve shaft and a plurality of threaded holes are provided on the movable shaft, and each of the insertion holes is connected to a respective one of the threaded hole by a bolt.

Figure 1:
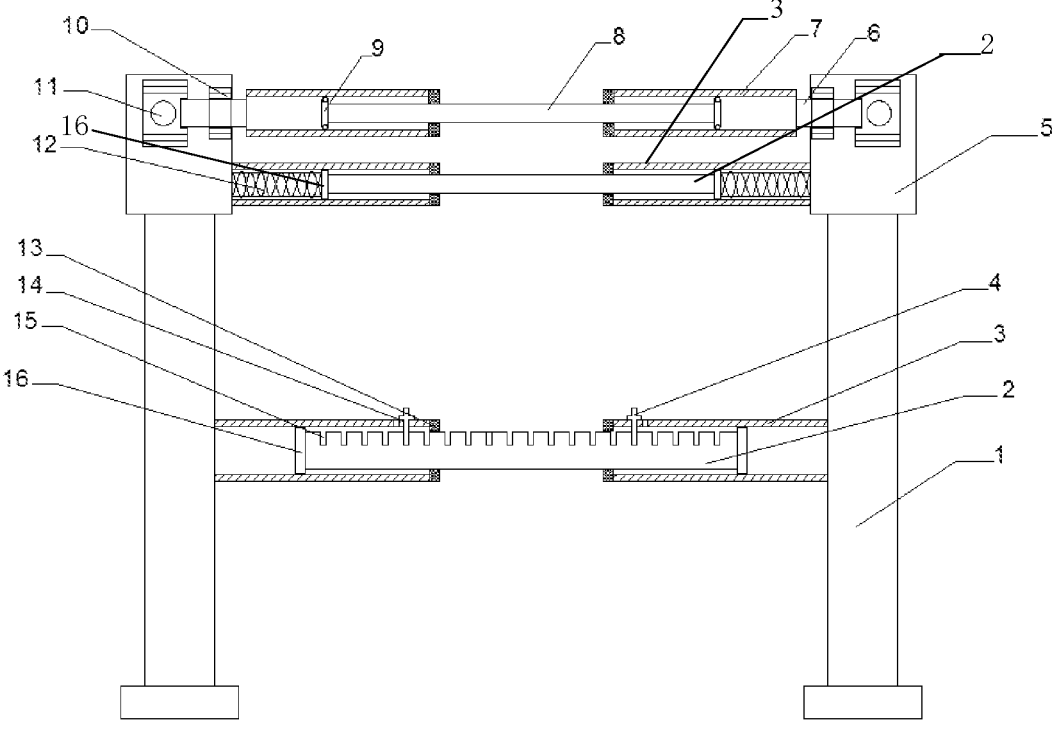
FIG. 1 is a schematic sectional view of a roller conveying rack taken in a direction perpendicular to a conveying direction according to an embodiment of the present disclosure.
Figure 2:
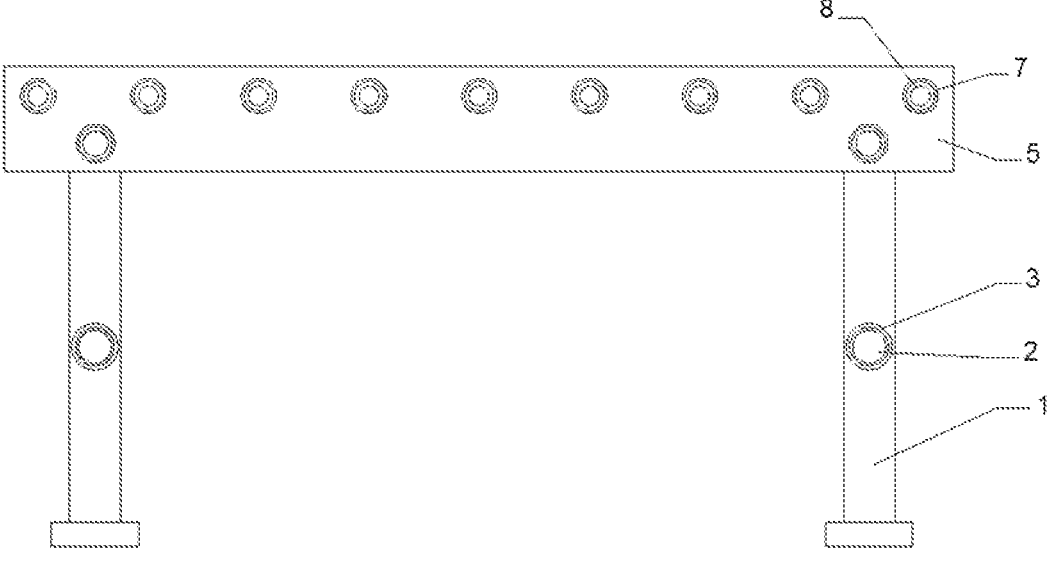
FIG. 2 is a schematic sectional view of a roller conveying rack taken in a direction parallel to a conveying direction according to an embodiment of the present disclosure.
Figure 3:
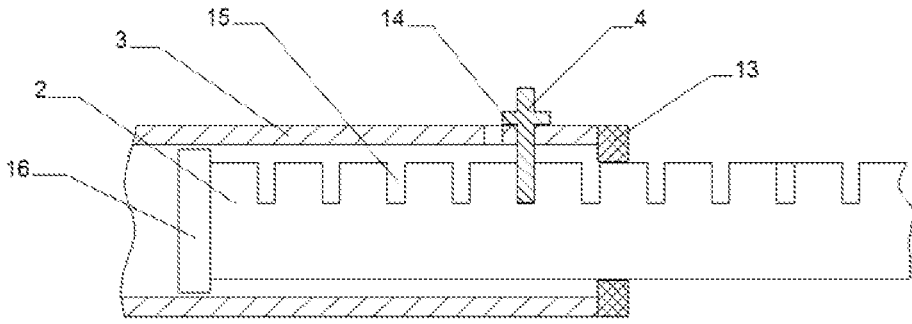
FIG. 3 is a schematic view of a connection structure of a sleeve shaft and a movable shaft between legs according to an embodiment of the present disclosure.

| List of reference signs: | | |
|---|---|---|
| 1. Leg; | 2. movable shaft; | 3. sleeve shaft; |
| 4. bolt; | 5. carrier plate; | 501. snap; |
| 502. slot; | 6. rotating shaft; | 7. rolling sleeve; |
| 8. connecting shaft; | 9. ball sliding sleeve; | 10. bearing; |
| 11. servo motor; | 12. spring shaft; | 13. blocking ring; |
| 14. insertion hole; | 15. threaded hole; | 16. limiting plate. |

DETAILED DESCRIPTION

Technical solutions in embodiments of the present disclosure will be clearly and completely described below in conjunction with drawings in the embodiments of the present application. Apparently, the described embodiments are only a part of embodiments of the present disclosure, rather than all the embodiments. Based on the embodiments in the present disclosure, all other embodiments obtained by those skilled in the art without creative work fall within the protection scope of the present disclosure.

In an implementation of the present disclosure, referring to FIGS. 1 to 7, a roller conveying rack for rapidly adjusting a width thereof includes two carrier plates 5 with rectangular shapes, wherein the two carrier plates 5 are arranged in parallel and aligned, legs 1 are disposed on both sides of a bottom of each of the carrier plates 5 in a longitudinal direction of the carrier plate 5, the legs 1 on different ones of the carrier plates 5 are connected by sleeve shafts 3 and each of the sleeve shafts 3 is broken in a middle portion, rolling sleeves 7 are arranged between upper portions of the two carrier plates 5 in the longitudinal direction of the carrier plates 5 and each of the plurality of rolling sleeves 7 is broken in a middle portion, movable shafts 2 are disposed at the broken middle portion of the sleeve shafts 3 and connecting shafts 8 are disposed at the broken middle portion of the rolling sleeves 7, both end portions of each of the movable shafts 2 are provided with limiting plates 16 and are inserted into a respective one of the sleeve shafts 3, and both end portions of each of the connecting shafts 8 are inserted into a respective one of the rolling sleeves 7, blocking rings 13 are provided at respective through-notches 17 within the sleeve shafts 3 and respective openings within the rolling sleeves 7, both end portions of each of the rolling sleeves 7 are provided with rotating shafts 6, each of the rotating shafts 6 is sleeved with a bearing 10 fixed onto a respective one of the carrier plates 5, and servo motors 11 for driving the rotating shafts 6 to rotate are provided in the carrier plates 5, a plurality of insertion holes 14 are provided on each of the sleeve shafts 3 between the legs 1 and a plurality of threaded holes 15 are provided on each of the movable shafts 2 between the legs 1, the plurality of insertion holes 14 located on each of the sleeve shafts 3 are symmetrically distributed on both opposite sides of the sleeve shaft 3 with a center of the movable shaft 2 as a center. That is, the plurality of insertion holes 14 on the sleeve shaft 3 between the legs 1 are at the same distance from a respective leg (the leg in contact with a portion of the sleeve shaft 3 where the insertion hole is located). Each of the insertion holes 14 is connected to a respective one of the threaded hole 15 by a bolt 4.

In an embodiment of the present disclosure, the insertion holes 14 are provided on both sides of each of the sleeve shafts 3 with a corresponding movable shaft 2 as a center, so that both sides of the sleeve shaft 3 may be fastened, to ensure stability and reliability of the fastening.

Figure 4:
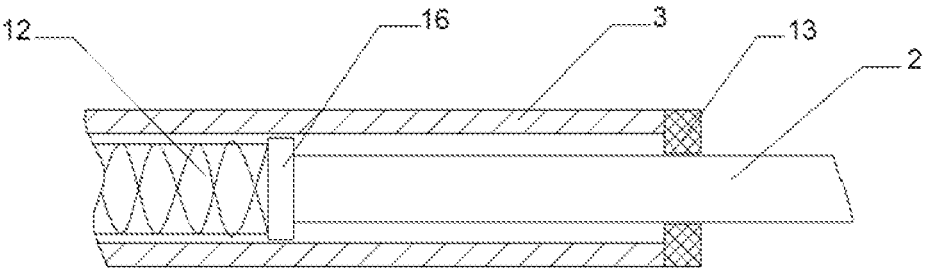
FIG. 4 is a schematic view of a connection structure of a sleeve shaft and a movable shaft between carrier plates according to an embodiment of the present disclosure.
Figure 5:
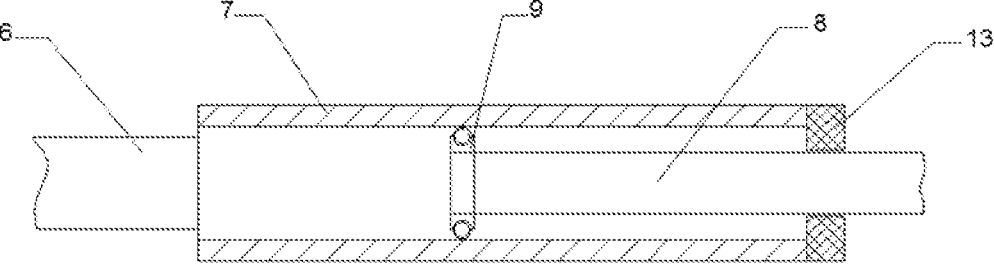
FIG. 5 is a schematic view of a connection structure of a rolling sleeve and a connecting shaft according to an embodiment of the present disclosure.
Figure 6:
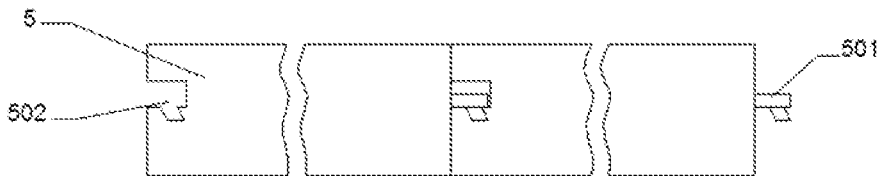
FIG. 6 is a schematic view of a connection structure of a snap and a slot according to an embodiment of the present disclosure.

Referring to FIG. 4, the roller conveying rack further includes a sleeve shaft broken in a middle portion and a movable shaft between lower portion of the carrier plates. A connection structure of the limiting plates 16, the sleeve shaft 3 and the movable shaft 2 between lower portion of the carrier plates 5 is similar with a connection structure of the limiting plates 16, the sleeve shaft 3 and the movable shaft 2 between the legs 1, except that the threaded holes 15 are not provided on the movable shaft 2 and the plurality of insertion holes 14 are not provided on the sleeve shaft 3. For clarity, the sleeve shaft 3 and the movable shaft 2 between the legs may be referred to be the first sleeve shaft 3 and the first movable shaft 2. The sleeve shaft 3 and the movable shaft 2 between lower portion of the carrier plates 5 may be referred to be the second sleeve shaft 3 and the second movable shaft 2.

In an embodiment of the present disclosure, each of the through-notches 17 within the sleeves 3 has a same depth as each of the rolling sleeves 7, and each of the movable shafts 2 has a same length as that of each of the connecting shafts. Therefore, the plurality of roller conveying racks may be kept consistent of the width during width adjustment, so as to prevent a problem that the carrier plate cannot reach an expected width after a width adjustment process due to a depth of the sleeve shaft and a length of the movable shaft between the legs different from a depth of the sleeve shaft and a length of the movable shaft between the carrier plates.

Figure 7:
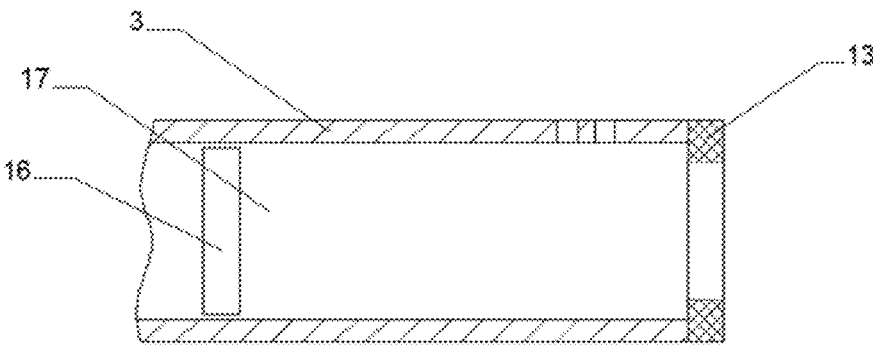
FIG. 7 is a schematic view of a sleeve shaft between legs according to an embodiment of the present disclosure.

Referring to FIGS. 1, 4 and 7, each of both ends of each of the movable shafts 2 between the carrier plates 5 is connected with one end of a spring shaft 12, and another end of the spring shaft 12 is fixed at a bottom of a respective one of the through-notches 17 of the sleeve shafts 3. The spring shafts at the both ends of each of the movable shafts between the carrier plates are connected with the bottom of the through-notches 17 of a respective one of the sleeve shaft. When the width of the roller conveying rack becomes wider, the spring shafts are stretched, to apply a tensile force to the two carrier plates connected to the spring shafts. When the width of the roller conveying rack becomes narrower, a thrust force is applied to the two carrier plates connected to the spring shafts. This reaction force may be used to avoid the problem that the bolt and the threaded hole are not connected tightly, and it may also be used to ensure stability and reliability of the fastening after the width is adjusted.

In an embodiment of the present disclosure, the ball sliding sleeves are provided respectively at both ends of each of the connecting shafts, so that when the rolling sleeves rotate under the drive of the servo motors, a rotational friction force between the rolling sleeves and the connecting shafts may be converted into a rolling friction force, thereby greatly reducing the friction to reduce the damage.

In an embodiment of the present disclosure, each of the carrier plates 5 is provided with at least one snap 501 at one of both ends in the longitudinal direction of the carrier plate 5, and at least one slot 502 at another end of the both ends, and the at least one snap 501 of each of the two carrier plates 5 is snapped into the at least one slot 502 of adjacent another carrier plate. The snap and the slot are respectively arranged at both ends of the carrier plates, so that two adjacent roller conveying racks may be connected through the snap and the slot, which ensures the integrity and stability of the entire conveying structure, and facilitates the disassembly and the assembly.

In an embodiment of the present disclosure, a roller conveying rack and a conveying structure including the roller conveying rack are provided in an embodiment of the present disclosure. Two sets of sleeve shafts and movable shafts are respectively arranged between the legs and between the carrier plates, so that the width of the entire roller conveying rack can be adjusted by manually pushing and pulling the legs. In addition, a rolling sleeve and a connecting shaft which are similar to the sleeve shaft and the movable shaft are provided in cooperation with the sleeve shaft and the movable shaft, so that the roller conveying racks in the entire conveying structure may be synchronized and linked when the width is adjusted, and the width adjustment operation is simplified and quickened.

In an embodiment of the present disclosure, ball sliding sleeves are provided respectively at both ends of each of the connecting shafts, so that when the rolling sleeves rotate under the drive of the servo motors, a rotational friction force between the rolling sleeves and the connecting shafts may be converted into a rolling friction force, thereby greatly reducing the friction to reduce the damage. The snap and the slot are respectively arranged at both ends of the carrier plates, so that two adjacent roller conveying racks may be connected through the snap and the slot, which ensures the integrity and stability of the entire conveying structure, and facilitates the disassembly and the assembly.

When the width of the transfer frame needs to be adjusted, first, the legs 1 under the two carrier plates 5 are manually moved close to each other or away from each other. When the above operation is performed, each movable shaft 2 is telescopically moved along the through-notches 17 in the sleeve shaft 3, and both ends of the connecting shaft 8 are telescopically moved in the rolling sleeve 7, to cooperate with the adjustment of the width. Secondly, when the roller conveying rack is adjusted to have a specified width, a certain allowance value is given. The width is further slightly adjusted, so that any one of the insertion holes 14 distributed on the sleeve shaft 3 between the legs and at both sides of the movable shaft 2 between the legs may be aligned with the threaded hole 15 on the movable shaft 2, the bolt 4 is screwed into the threaded hole 15, to complete fastening. Finally, the width adjustment of the roller conveying rack is quickly and easily completed.

Provided is a roller conveying rack capable of quickly adjusting the width, in which two sets of sleeve shafts and movable shafts are respectively arranged between the legs and between the carrier plates, so that the width of the entire roller conveying rack can be adjusted by manually pushing and pulling the opposite legs. In addition, a rolling sleeve and a connecting shaft which are similar to the sleeve shaft and the movable shaft are provided in cooperation with the sleeve shaft and the movable shaft, so that the roller conveying racks in the entire conveying structure may be synchronized and linked when the width is adjusted, and the width adjustment operation is simplified and quickened.

While some embodiments of the present disclosure have been shown and described, it will be understood by those skilled in the art that various changes, modifications, substitutions and variations may be made thereto without departing from the principles and spirit of the present disclosure, and the scope of the present disclosure is defined by the appended claims and their equivalents.

What is claimed is:

1. A roller conveying rack, comprising two carrier plates being rectangular,
   wherein the two carrier plates are arranged in parallel and aligned, legs are disposed on both sides of a bottom of each of the carrier plates in a longitudinal direction of the carrier plate, the legs on different ones of the carrier plates are connected by first sleeve shafts and each of the first sleeve shafts is broken in a middle portion,
rolling sleeves are arranged between upper portions of the two carrier plates in the longitudinal direction of the carrier plates and each of the plurality of rolling sleeves is broken in a middle portion,
first movable shafts are disposed at the broken middle portion of the first sleeve shafts and connecting shafts are disposed at the broken middle portion of the rolling sleeves,
both end portions of each of the first movable shafts are provided with limiting plates and are inserted into a respective one of the first sleeve shafts, and both end portions of each of the connecting shafts are inserted into a respective one of the rolling sleeves,
through-notches are formed within the first sleeve shafts, and blocking rings are provided at edges of the first sleeve shafts at the broken middle portion and at edges of the rolling sleeves at the broken middle portion,
both end portions of each of the rolling sleeves are provided with rotating shafts,
each of the rotating shafts is sleeved with a bearing fixed onto a respective one of the carrier plates, and servo motors for driving the rotating shafts to rotate are provided in the carrier plates, and
a plurality of insertion holes are provided on each of the first sleeve shafts between the legs and a plurality of threaded holes are provided on each of the first movable shafts between the legs, and each of the insertion holes is connected to a respective one of the threaded holes by a bolt.

2. The roller conveying rack of claim 1, wherein the plurality of insertion holes located on each of the first sleeve shafts between the legs are distributed on both opposite sides of the first sleeve shaft symmetrically.

3. The roller conveying rack of claim 1, wherein a depth of each of the through-notches within the first sleeve shafts is same as a length of each of the rolling sleeves, and each of the first movable shafts has a same length as that of each of the connecting shafts.

4. The roller conveying rack of claim 1, wherein the roller conveying rack further comprises second sleeve shafts and second movable shafts between lower portion of the carrier plates, and
   wherein through-notches are formed within the second sleeve shafts, each of both ends of each of the second movable shafts between the carrier plates is connected with one end of a spring shaft, and another end of the spring shaft is fixed at a bottom of a respective one of the through-notches of the second sleeve shafts.

5. The roller conveying rack of claim 1, wherein ball sliding sleeves are provided respectively at both ends of the connecting shaft, and the ball sliding sleeves are in sliding connection respectively with the rolling sleeves.

6. The roller conveying rack of claim 1, wherein each of the carrier plates is provided with at least one snap at one of both ends in the longitudinal direction of the carrier plate, and at least one slot at another end of the both ends, and the at least one snap of each of the two carrier plates is snapped into the at least one slot of adjacent another carrier plate.

7. A roller conveying rack, comprising:
   two carrier plates arranged in parallel and aligned, wherein each of the two carrier plates (5) has a rectangular shape; and
   legs disposed on both sides of a bottom of each of the carrier plates in a longitudinal direction of the carrier plate, wherein any two opposite legs of the legs in a width direction of the carrier plate are connected by a first sleeve shaft broken in a middle portion and a first movable shaft, the two carrier plates are connected by at least one set of a rolling sleeve broken in a middle portion and a connecting shaft, wherein a plurality of insertion holes are provided on the first sleeve shaft between the legs and a plurality of threaded holes are provided on the first movable shaft, and each of the insertion holes is connected to a respective one of the threaded holes by a bolt.

8. The roller conveying rack of claim 7, wherein the roller conveying rack further comprises a second sleeve shaft broken in a middle portion and a second movable shaft between lower portion of the carrier plates, and the at least one set of a rolling sleeve broken in a middle portion and a connecting shaft are arranged between upper portions of the two carrier plates and distributed in the longitudinal direction of the carrier plates, the first movable shaft and the second movable shaft are respectively disposed at the middle portion of the first sleeve shaft and a middle portion of the second sleeve shaft and the connecting shaft is disposed at the middle portion of the rolling sleeve, both end portions of the first movable shaft are provided with limiting plates and are inserted into the first sleeve shaft, and both end portions of the connecting shaft are inserted into the rolling sleeve, through-notches are formed within the first sleeve shafts and the second sleeve shafts, blocking rings are provided at edges the first sleeve shafts and the second sleeve shafts at the broken middle portion and within the rolling sleeve at the broken middle portion, both end portions of the rolling sleeve are provided with rotating shafts, each of the rotating shafts is sleeved with a bearing fixed onto a respective one of the carrier plates, and a servo motors for driving the rotating shafts to rotate are provided in the carrier plates.

9. The roller conveying rack of claim 8, wherein the rolling sleeve has a same central axis as the rotating shaft.

10. The roller conveying rack of claim 8, wherein each of the servo motors is provided on a side of the bearing away from the rolling sleeve.

11. The roller conveying rack of claim 8, wherein a depth of each of the through-notches within the first sleeve shafts and the second sleeve shafts is same as a length of the rolling sleeve, and each of the first sleeve shafts and the second movable shafts has a same length as the connecting shaft.

12. The roller conveying rack of claim 8, wherein each of both ends of the second movable shaft between the carrier plates is connected with one end of a spring shaft, and another end of the spring shaft is fixed at a bottom of a respective one of the through-notches of the second sleeve shaft.

13. The roller conveying rack of claim 7, wherein the plurality of insertion holes on the first sleeve shaft between the legs are distributed on both opposite sides of the first sleeve shaft in the width direction of the carrier plate symmetrically.

14. The roller conveying rack of claim 7, wherein the connecting shaft and the rolling sleeve are parallel to the width direction of the carrier plate and the connecting shaft is slidably connected to the rolling sleeve.

15. The roller conveying rack of claim 7, wherein ball sliding sleeves are provided respectively at both ends of the connecting shaft, and the ball sliding sleeves are in sliding connection respectively with the rolling sleeve.

16. The roller conveying rack of claim 7, wherein each of the carrier plates comprises at least one snap at one of both ends in the longitudinal direction of the carrier plate, and at least one slot at another end of the both ends, and the at least one snap of each of the two carrier plates is snapped into the at least one slot of adjacent another carrier plate.

* * * * *